United States Patent
Guo et al.

(10) Patent No.: US 9,854,231 B2
(45) Date of Patent: Dec. 26, 2017

(54) SILICON PHOTOMULTIPLIERS WITH INTERNAL CALIBRATION CIRCUITRY

(71) Applicant: General Electric Company, Schenectady, NY (US)

(72) Inventors: Jianjun Guo, Ballston Spa, NY (US); Sergei Ivanovich Dolinsky, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 344 days.

(21) Appl. No.: 14/574,836

(22) Filed: Dec. 18, 2014

(65) Prior Publication Data

US 2016/0182902 A1    Jun. 23, 2016

(51) Int. Cl.

| | | |
|---|---|---|
| H01L 27/00 | (2006.01) | |
| H04N 17/00 | (2006.01) | |
| H04N 5/341 | (2011.01) | |
| G01T 1/20 | (2006.01) | |
| G01T 1/208 | (2006.01) | |
| G01T 1/24 | (2006.01) | |

(52) U.S. Cl.
CPC ......... *H04N 17/002* (2013.01); *G01T 1/208* (2013.01); *G01T 1/2018* (2013.01); *G01T 1/248* (2013.01); *H04N 5/341* (2013.01)

(58) Field of Classification Search
CPC ............................. H04N 17/00; H04N 5/341
USPC .............................. 250/208.1, 214.1, 370.01
See application file for complete search history.

(56) References Cited

U.S. PATENT DOCUMENTS

| | | |
|---|---|---|
| 7,800,070 B2 | 9/2010 | Weinberg et al. |
| 8,193,815 B2 | 6/2012 | Prescher et al. |
| 8,269,181 B2 | 9/2012 | Saveliev |
| 8,395,125 B1 | 3/2013 | Prescher et al. |
| 8,476,594 B2 | 7/2013 | Frach et al. |
| 8,581,188 B2 | 11/2013 | Barbi et al. |
| 8,994,136 B2 * | 3/2015 | Park ................... H01L 27/1446 257/438 |
| 2008/0203309 A1 | 8/2008 | Frach et al. |
| 2011/0079727 A1 | 4/2011 | Prescher et al. |
| 2014/0110573 A1 | 4/2014 | Wang et al. |

OTHER PUBLICATIONS

"Digital Silicon Photomultiplier", Philips, 2014, 2pgs.

* cited by examiner

*Primary Examiner* — Kevin Pyo
(74) *Attorney, Agent, or Firm* — Pabitra K. Chakrabarti

(57) ABSTRACT

A silicon photomultiplier includes a plurality of microcells providing a pulse output in response to an incident radiation, each microcell including circuitry configured to enable and disable the pulse output. Each microcell includes a cell disable switch. The control logic circuit controls the cell disable switch and a self-test circuit. A microcell's pulse output is disabled when the cell disable switch is in a first state. A method for self-test calibration of microcells includes providing a test enable signal to the microcells, integrating dark current for a predetermined time period, comparing the integrated dark current to a predetermined threshold level, and providing a signal if above the predetermined threshold level.

18 Claims, 5 Drawing Sheets

SILICON PHOTOMULTIPLIERS WITH INTERNAL CALIBRATION CIRCUITRY

BACKGROUND

Photon sensors can be implemented using an array of microcells containing avalanche photo diodes (APD). The APDs can be fabricated on a silicon wafer as a silicon photomultipliers (SiPM). In conventional silicon photo multiplier devices each individual APD can be connected to a readout network via a quenching resistor having typical values between 100 kΩ-1 MΩ. When a bias voltage applied to the SiPM is above breakdown, a detected photon generates an avalanche, the APD capacitance discharges to a breakdown voltage and the recharging current creates a signal.

SiPM technology can have an intrinsic dark count (i.e., response in the absence of light—typically from thermionic emissions), which can be due to crystal defects, impurities, and other anomalies. The distribution of defects among the individual microcells of an array can be non-uniform resulting in the possibility of a small number of microcells per device having a very high dark count generation rate.

Noisy microcells within the array can be located by measuring the photoluminescence of the SiPM under an applied voltage. Identified noisy microcells can be disconnected from the array by using laser pulses. Actual implementation of this method is very complicated and expensive. For these reasons the approach is not attractive for implementation in high-volume SiPM production.

Another approach to identify noisy microcells is to measure the dark count of each microcell and programmatically inhibit noisy ones. To implement this approach, each microcell needs to have an address line with a unique address. Additionally, the individual microcells are fabricated to include a static memory cell that can be used to disable or enable the microcell. An external controller is required to implement the calibration process.

DESCRIPTION

In accordance with embodiments, microcells are fabricated to include circuitry that self-tests the microcell to identify microcells with high dark count rate. If the dark count rate is above a predetermined threshold, the circuitry can disable the microcell. In accordance with implementations, this self-test procedure can be performed when the device is powered-on and/or by command received as a reset signal to the microcell. In accordance with embodiments, a monitor is incorporated to count the number of microcells disabled during the self-test. The monitor tracks the count of disabled microcells within the array. If the number of disabled microcells within the array reaches a predetermined number, the monitor can inhibit the circuitry from disabling anymore of the microcells. In accordance with embodiments, the number of active microcells within the array is kept above a predetermined threshold.

A typical dark count rate of APDs fabricated in SiPM technology is about 100 kilo counts-per-second (Kcps) per square millimeter. This rate corresponds to about 250 cps per microcell for a SiPM microcell size of 50 microns by 50 microns. In accordance with embodiments, the integral self-test circuit can detect dark count pulses during a self-test procedure. This self-test procedure can be done at power-on, or by a reset command. The self-test can have a duration of approximately 0.1-1.0 seconds depending on average noise level. If the dark count number exceeds a threshold value, circuitry within the microcell will disable the microcell until the next self-test procedure is initiated. In accordance with implementations, a special pulse is provided to a device summing block which limits the number of micro cells per device to be turned off.

Figure 1:
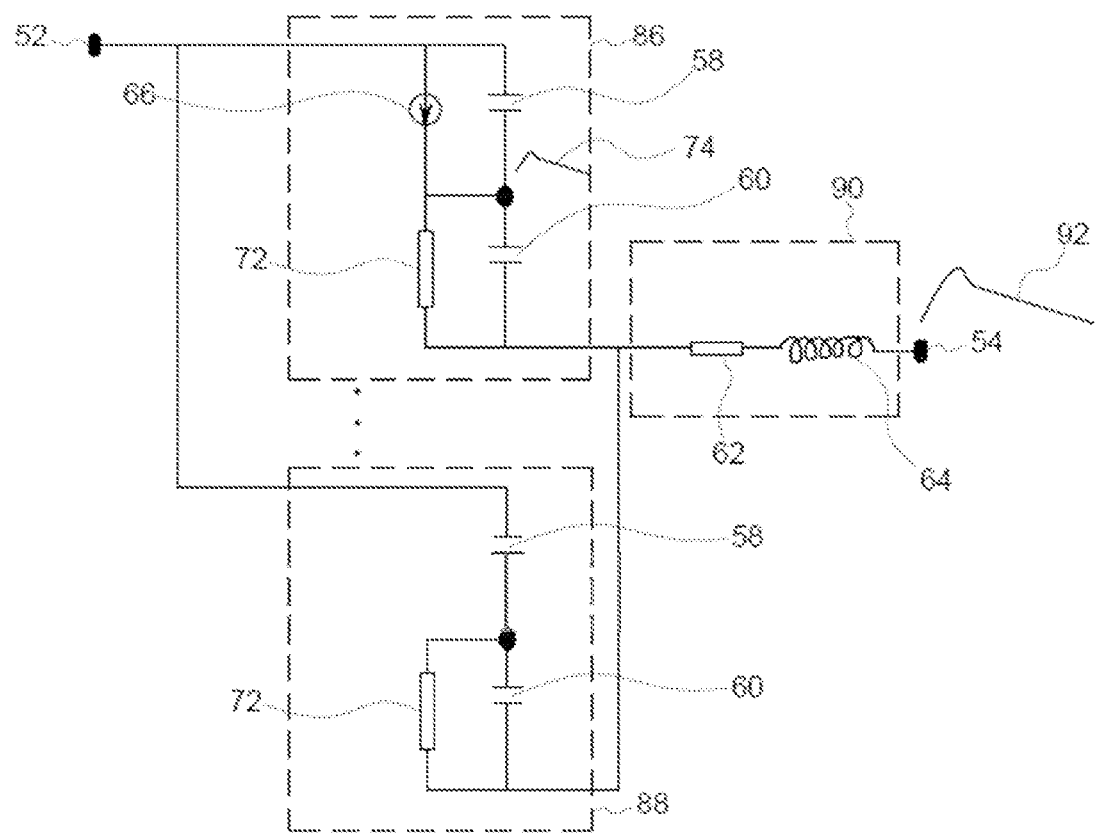
FIG. 1 depicts a simplified electrical model of a conventional silicon photomultiplier pixel having an array of microcells.

FIG. 1 depicts a simplified electrical model of a conventional silicon photomultiplier pixel, where the microcell is one of a plurality of microcells within an SiPM array of such cells. In one example, the depicted microcell may be part of an array of single photon avalanche diodes (SPAD) operated in Geiger mode within an analog SiPM. In the depicted example, the model has an associated cathode 52 and anode 54. The microcell portion of the model includes a diode capacitor 58 and a current pulse 66, such as may be associated with a photodiode. Quench circuitry in the depicted example includes a quench resistor 72 and a parasitic quench capacitor 60. Downstream of the quench circuitry, in this example, a parasitic resistor 62 and parasitic inductor 64 are modeled.

In this model each individual APD of a microcell, such as the depicted microcell, is connected to a readout network via the quenching circuitry, including the quenching resistor (Rq) 72 with typical values between about 100 kΩ to about 1 MΩ. When a detected photon generates an avalanche event, a current pulse 66 is generated and the microcell diode capacitance Cd 58 discharges down to the breakdown voltage and the recharging current creates a measurable output signal. The typical pulse shape 74 of a single photo electron (SPE) signal has fast rise time (i.e., a sharp rising edge) followed by a long fall time (i.e., a slow falling tail).

Figure 2A:
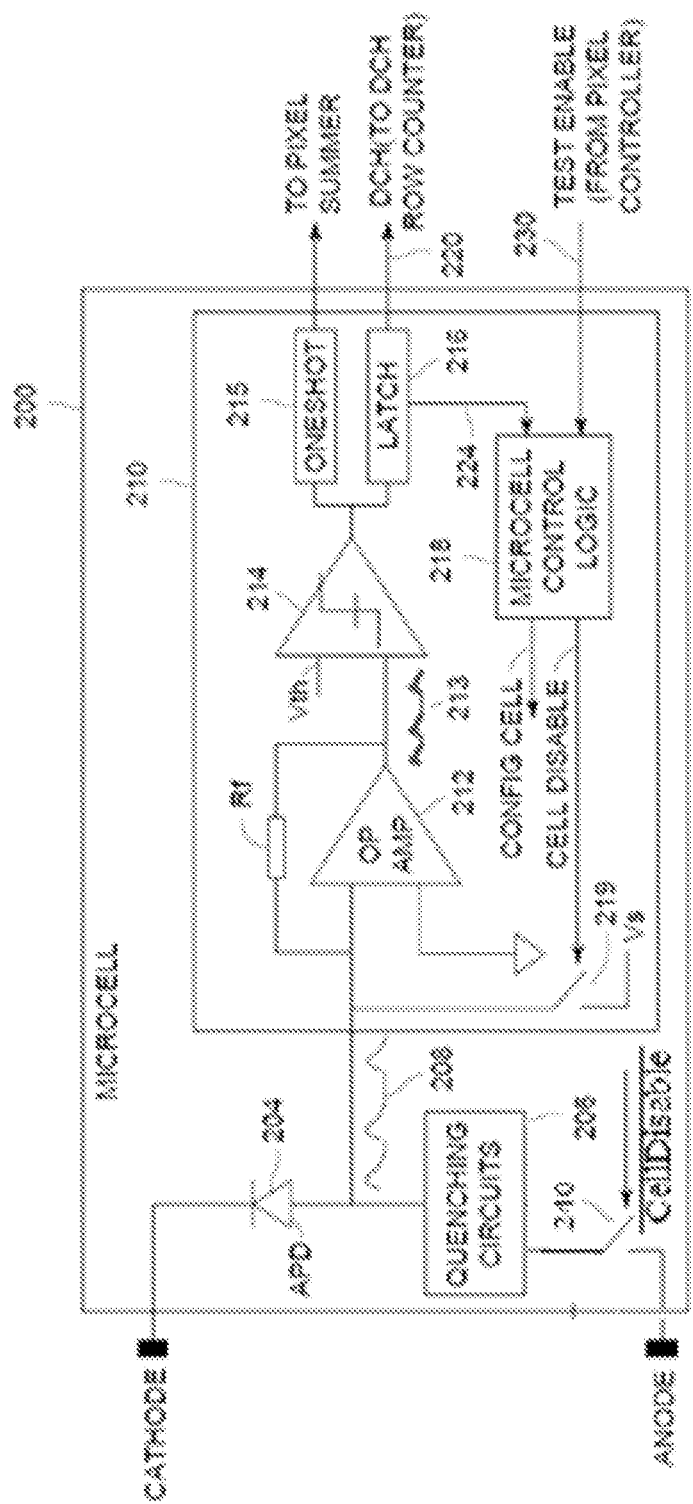
FIGS. 2A-2B depict a schematic of a microcell in accordance with some embodiments.
Figure 2B:
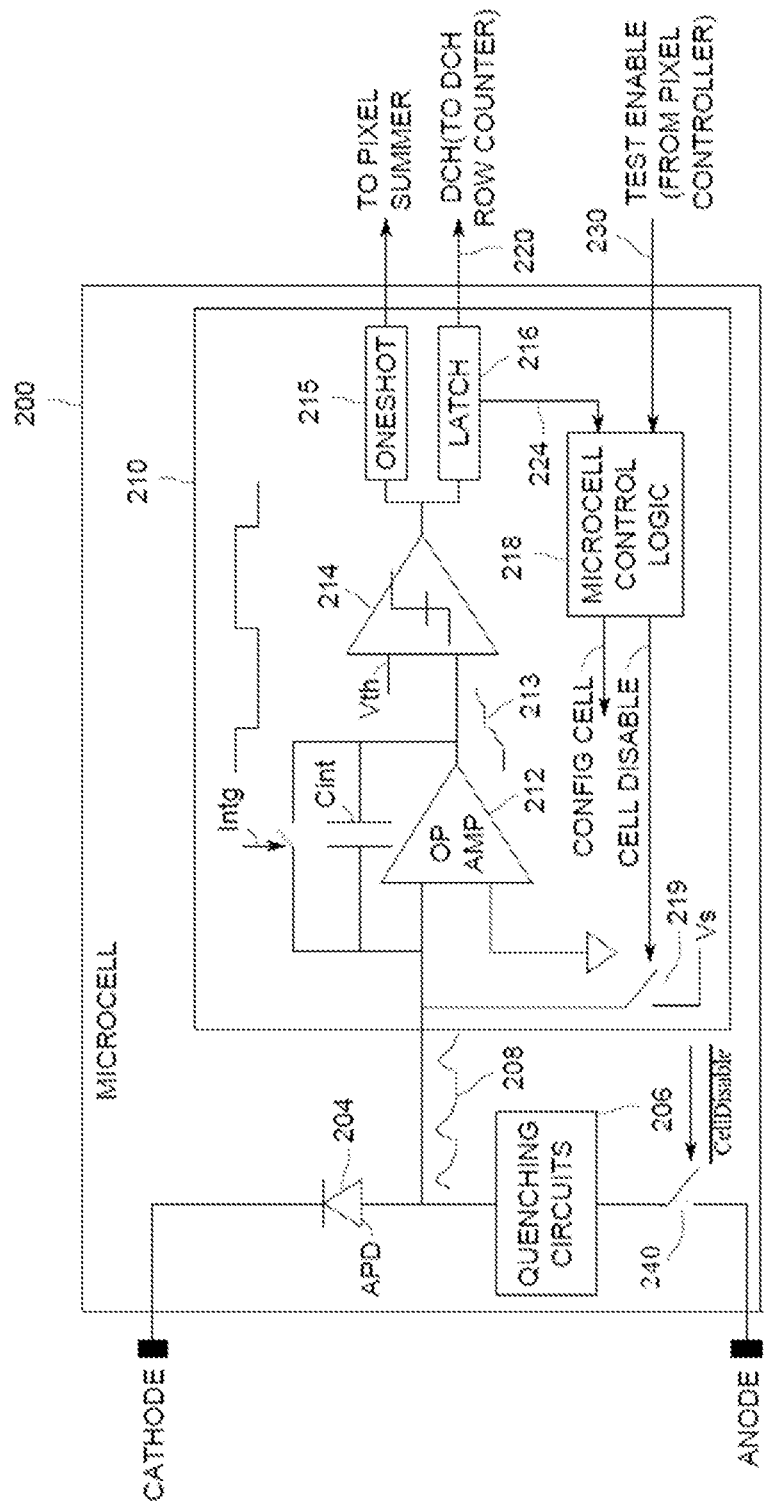

FIGS. 2A-2B depicts microcell 200 containing self-test circuitry 210 in accordance with some embodiments. FIG. 2A depicts microcell 200 in normal operational mode. FIG. 2B depicts the microcell in a self-test mode. Microcell 200 includes APD 204 in series with quenching circuit 206. In accordance with embodiments, self-test circuitry 210 is connected at the junction of the APD and quenching circuits. In accordance with implementations, self-test circuitry 210 is fabricated on the silicon wafer with the SiPM and is integrated as part of the microcell.

Self-test circuitry 210 includes operational amplifier (OP AMP) 212 with feedback resistance Rf, capacitance Cint and associated circuit components, controlled by the ConfigCell signal from microcell control logic 218. In one implementation, the OP AMP can be configured as a current sense amplifier. One input of the current sense amplifier is connected to the junction of the APD and quenching circuits to receive signal 208. In accordance with an embodiment, the other terminal of current sense amplifier 212 is connected to a reference voltage level (e.g., common ground in one implementation). The current sense amplifier provides current sense amplifier output signal 213 that has a voltage proportional to the current intensity of signal 208.

FIG. 2A depicts the normal operational mode configuration of microcell 200. In this mode the TestEnable signal 230 is set to be false, switch 240 is closed, and switch 219 is open by default, while it can be closed based on the microcell control logic 218 status during the previous self-test procedure cycle. The output of current sense amplifier 212 is provided as one input to operational amplifier (or comparator) 214, which compares the voltage of signal 213 to a predetermined threshold voltage Vth at the second input terminal of operational amplifier 214. When the voltage of signal 213 exceeds (in absolute voltage level) the threshold voltage, operational amplifier 214 produces a logic signal at its output. The output of operational amplifier 214 is connected to one-shot pulse circuit 215. In normal operational mode (FIG. 2A), the one-shot pulse circuit provides a pulse to a pixel summer. The latch circuit 216 is disabled by microcell control logic 218 in this mode.

FIG. 2B depicts the self-test mode configuration of microcell 200. The rising edge of the TestEnable signal by the pixel controller from input line 230 resets microcell control logic 218 which causes switch 219 to open and switch 240 to close. In the self-test mode, microcell control logic circuit 218 provides CellDisable signal as true if the dark counts of the microcell is high, which closes switch 219 and opens switch 240. During the self-test mode, the microcell control logic circuitry disables oneshot 215 via ConfigCell signal, and enables the latch 216. Integration capacitor Cint is switched in to the feedback loop of OP AMP 212 configured as a charge sensitive amplifier. Clock signal Intg sets and resets the integration duration of capacitor Cint. The clock signal is provided by the pixel controller or the microcell control logic circuitry.

The comparison determined by operational amplifier 214 determines whether the dark count rate of the APD exceeds the predetermined threshold. If the dark count rate is too high, comparator 214 trips, CellDisable will be high to close the switch connected to a voltage source Vs, reducing the bias voltage across the APD thus disabled, and the quenching circuitry 206 is disabled and disconnects the microcell from anode. If the dark count rate is too high, microcell 200 provides a dark count high (DCH) signal to the pixel controller.

The pixel control counts the number of disabled microcells by summing the DCH row counters. If the number of disabled microcells is higher than a predetermined value, the pixel controller can issue commands to redo or stop the test, while performing either one or both of the following steps until the total number of disabled microcells is below the predetermined value. First, the comparator threshold voltage Vth can be raised under the control of the pixel controller. Second, the duration of the integration set by clock signal Intg can be reduced by altering the pulse width of the clock signal. In accordance to embodiments, individual addressing of microcells is not required. In some implementations, embodying methods can be extended to address microcells by row and/or column.

The TestEnable signal on input line 230 is one input to microcell control logic circuitry 218. The logic circuitry combines the TestEnable 230 signal with signal 224 from latch 216. If both signals are present, switch 219 is activated, and switch 240 is open to disconnect the microcell from anode 54. With switch 219 activated, supply voltage Vs is provided to the input of OP AMP 212.

Figure 3:
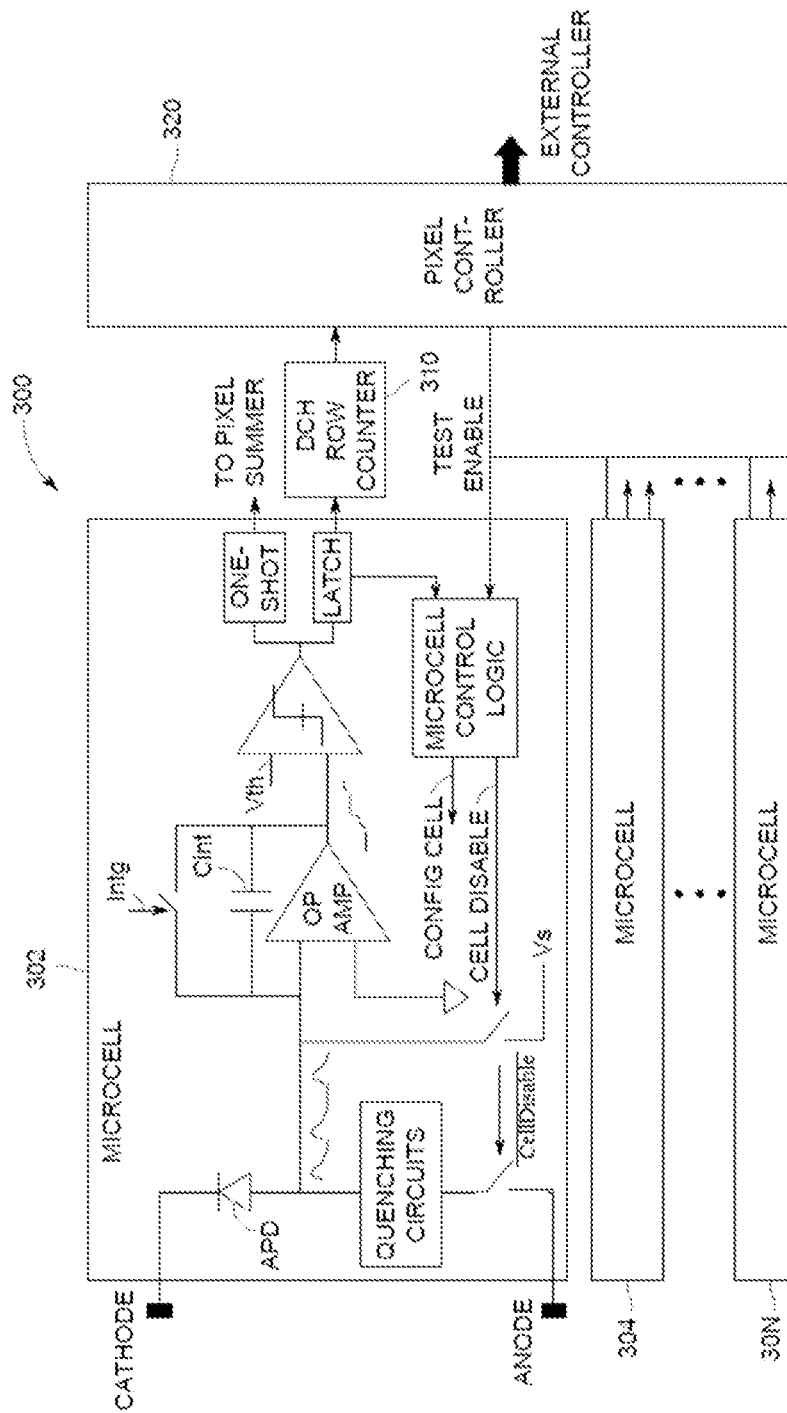
FIG. 3 depicts a block diagram of an array of microcells in accordance with some embodiments.

FIG. 3 depicts silicon photomultiplier microcell array 300 with a pixel controller in accordance with some embodiments. Microcell array 300 includes multiple microcells 302, 304, . . . , 30N. These microcells are an implementation of microcell 200 disclosed above with regard to FIGS. 2A-2B, in accordance with embodiments. FIG. 3 depicts microcell 200 in the self-test mode of FIG. 2B. Each of the microcells is connected by an output line from the microcell latch to DCH row counter 310, which provides an input to pixel controller 320. The one-shot output from the microcell is provided to a pixel summer Additionally, the microcells are connected to a TestEnable line from the pixel controller.

Figure 4:
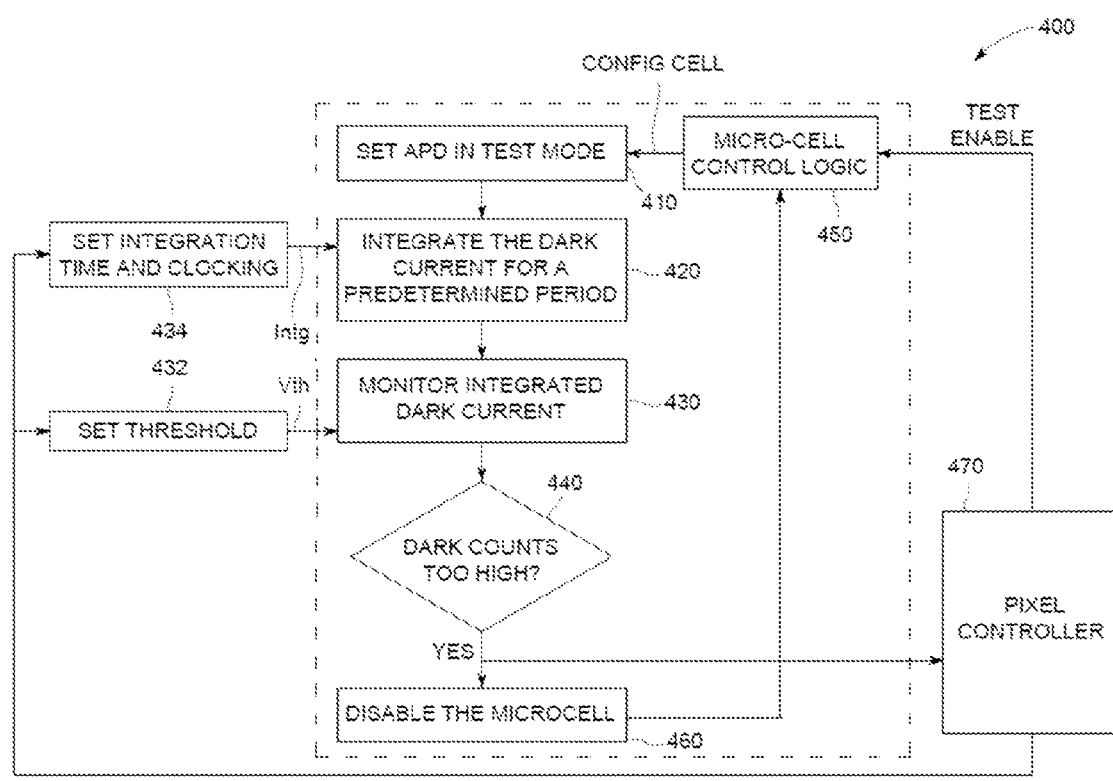
FIG. 4 depicts a process in accordance with some embodiments.

FIG. 4 depicts process 400 for performing a self-test calibration on a microcell APD SiPM in accordance with embodiments. The APD is set to a self-test/calibration mode, step 410. To enter the self-test mode, the microcell is configured as disclosed with regard to FIG. 2B, above. During a predetermined time period set by clock signal Intg, any dark current generated by the APD is integrated, step 420. The integration can be done by amplifier 212 configured as a charge sensitive amplifier in accordance with some implementations. The integrated dark current is monitored, step 430, and compared to a predetermined set threshold level, step 432. The monitoring can be performed by operational amplifier 214 that compares an output voltage from the charge sensitive amplifier 212 to a threshold voltage level. If the dark count rates are above the threshold level, step 440, process 400 provides a signal indicating that the dark count rates are high to the pixel controller (step 470). If the dark count rate is above a threshold, the microcell is disabled, step 460, by the microcell control logic, step 450. In response to the DCH signals from all the microcells, the pixel controller updates and sends TestEnable signal, step 470, to the microcell control logic 450, to stop the testing or reset and start new testing with different parameters.

Systems and methods in accordance with embodiments can improve overall photon detector performance by managing individual microcells of an array of microcells that provide dark counts. Implementation of embodiments can increase acceptable wafer fabrication yields resulting in overall cost reductions in manufacturing detectors.

Although specific hardware and methods have been described herein, note that any number of other configurations may be provided in accordance with embodiments of the invention. Thus, while there have been shown, described, and pointed out fundamental novel features, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated.

The invention claimed is:

1. A silicon photomultiplier array comprising:
a plurality of microcells each providing a pulse output in response to an incident radiation, each microcell including circuitry configured to enable and disable the pulse output; each of the plurality of microcells including a cell disable switch and a self-test circuit, wherein the pulse output is disabled when the cell disable switch is in a first state;
a row counter connected to a predefined row among the plurality of microcells, and configured to count a latch signal output of each microcell of the predefined row; and
a pixel controller connected to the row counter, the pixel controller configured to provide a signal to a control logic circuit of each of the plurality of microcells, wherein the row counter provides a dark count high indication signal to the pixel controller.

2. The silicon photomultiplier array of claim 1, wherein the pixel controller is configured to monitor the dark count high indication signal and, if the dark count high indication is below a predetermined threshold of inhibited microcells, provide an inhibit signal to the plurality of microcells.

3. The silicon photomultiplier array of claim 2, wherein the pixel controller is configured to remove the inhibit signal if the dark count high indication is above a predetermined number of inhibited microcells.

4. The silicon photomultiplier array of claim 1, further comprising a control logic circuit for providing a configure cell signal to components of its respective microcell.

5. The silicon photomultiplier array of claim 4, wherein the configure cell signal is operative to cause a change in a comparator threshold voltage reference of the respective microcell.

6. The silicon photomultiplier array of claim 1, further comprising a pixel summer connected to the pulse output of each of the plurality of microcells.

7. The silicon photomultiplier array of claim 1, wherein the self-test circuit is configured to provide a latch signal in response to a self-test operation.

8. The silicon photomultiplier array of claim 7, further comprising a second control logic circuit configured to provide a control signal to the cell disable switch based on a pixel controller signal and a signal provided by a latch circuit, the control signal causing the cell disable switch to change between two states.

9. A silicon photomultiplier array comprising:
a plurality of microcells for providing a pulse output in response to an incident radiation, each microcell including circuitry configured to enable and disable the pulse output;
each of the plurality of microcells including a cell disable switch and a self-test circuit, wherein the pulse output is disabled when the cell disable switch is in a first state;
each of the plurality of microcells including:
an avalanche photodiode having an anode terminal and a cathode terminal;
a first operational amplifier having an output terminal, a first input terminal in electrical communication with the cathode terminal and a second input terminal connected to a reference voltage level;
a second operational amplifier having an input in electrical communication with the first operational amplifier output, the second operational amplifier having another input connected to a threshold voltage and an output in electrical communication with a one shot pulse circuit;
a one shot pulse circuit configured to generate the pulse output; and
a latch circuit in electrical communication with the second operational amplifier output.

10. The silicon photomultiplier array of claim 9, wherein the first operational amplifier is configured as a current sense amplifier.

11. The silicon photomultiplier array of claim 9, further comprising a quenching circuit connected in series with the cathode terminal.

12. The silicon photomultiplier array of claim 9, further comprising a pixel controller configured to monitor the dark count high indication signal and, if the dark count high indication is below a predetermined threshold of inhibited microcells, provide an inhibit signal to the plurality of microcells.

13. The silicon photomultiplier array of claim 12, wherein the pixel controller is configured to remove the inhibit signal if the dark count high indication is above a predetermined number of inhibited microcells.

14. The silicon photomultiplier array of claim 9, further comprising a control logic circuit for providing a configure cell signal to components of its respective microcell.

15. The silicon photomultiplier array of claim 14, wherein the configure cell signal is operative to cause a change in a comparator threshold voltage reference of the respective microcell.

16. The silicon photomultiplier array of claim 9, further comprising a pixel summer connected to the pulse output of each of the plurality of microcells.

17. The silicon photomultiplier array of claim 9, wherein the self-test circuit is configured to provide a latch signal in response to a self-test operation.

18. The silicon photomultiplier array of claim 16, further comprising a control logic circuit configured to provide a control signal to the cell disable switch based on a pixel controller signal and a signal provided by the latch circuit, the control signal causing the cell disable switch to change between two states.

* * * * *